June 27, 1967  J. BASSANO  3,328,174

PROCESS FOR DRYING PASTE PRODUCTS

Filed April 21, 1966  2 Sheets-Sheet 1

INVENTOR
Joseph Bassano
BY Alexander Howell
ATTORNEY

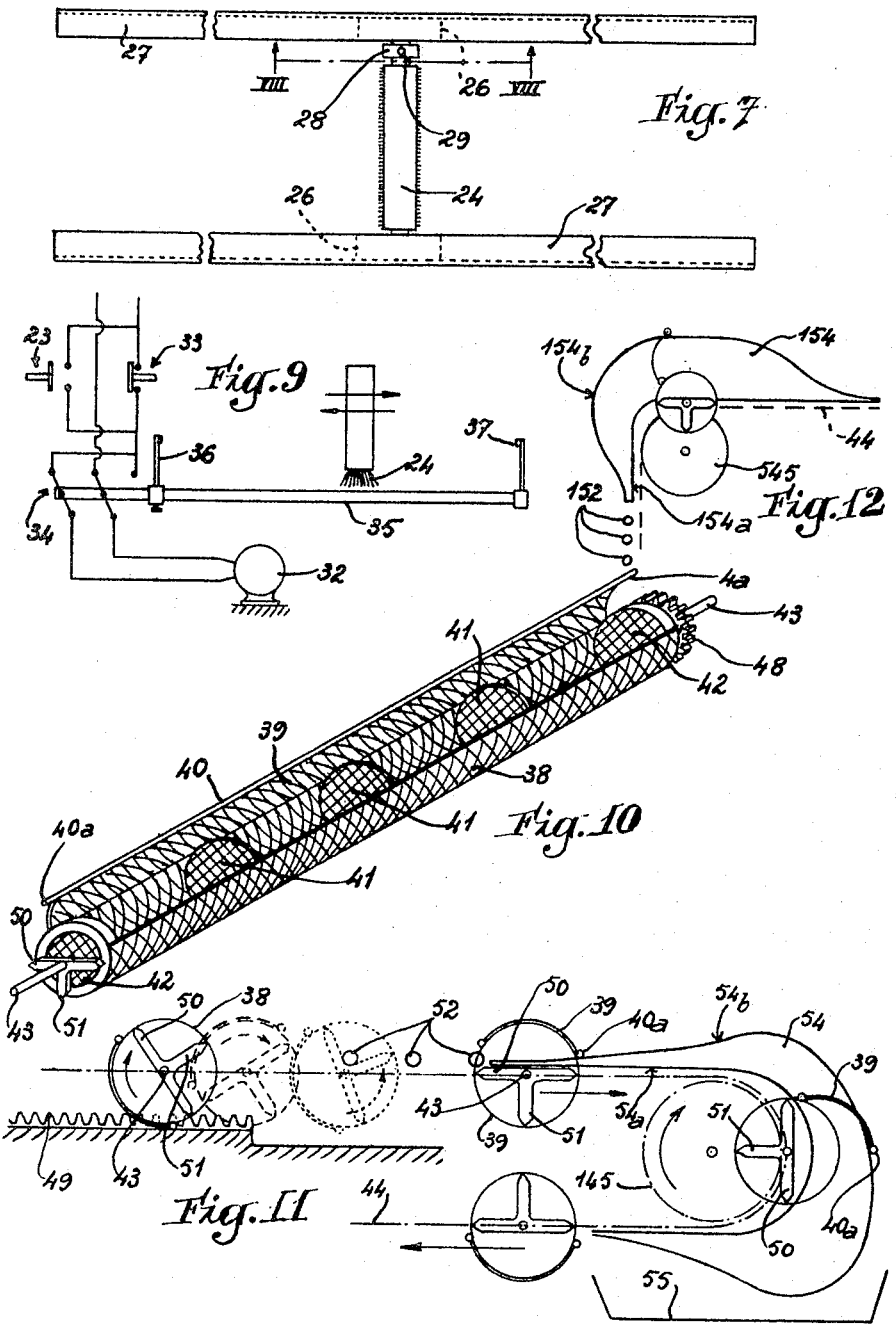

3,328,174
PROCESS FOR DRYING PASTE PRODUCTS
Joseph Bassano, Ave. Jean-Jaures,
Saint-Didier-au-Mont-d'Or, France
Filed Apr. 21, 1966, Ser. No. 544,236
Claims priority, application France, Mar. 27, 1962,
42,440, Patent 1,326,497
3 Claims. (Cl. 99—85)

The present application is a continuation-in-part of my copending application Ser. No. 265,688, filed March 18, 1963, now abandoned.

The present invention relates to the drying of Italian paste products of substantial length such as tubular macaroni or plain spaghetti, which are commonly referred to in the art as long goods.

Such long goods are generally sold in lengths of about 10 inches packed in cylindrical or parallelepipedic packages and it is obviously essential that the products be of equal length and free from any distortion. In the conventional drying methods the soft paste strings from the extruding machines are cut into lengths of somewhat more than 40 inches and these lengths are folded to inverted U-shape on successive rods which are conveyed through an appropriate drier. The dried U-shaped lengths are automatically sawed as they issue from the drier, each length giving four straight pieces of 10 inches which constitute the commercial product ready for the packaging operation, and an elbow and two short ends which are crushed and returned to the manufacturing process. The drying time is quite long. The sawing operation is rather delicate and the cutters need frequent resharpenings. Further the elbows and the ends correspond to a noticeable reduction of the manufacturing output.

It has been proposed to directly cut to the desired length the soft strings issuing from the extruding machine and to dry the straight pieces thus obtained on perforated screens or like surfaces on which they are disposed in substantially parallel relation. But, apart from the fact that driers operating with drying screens are extremely cumbersome, the products dried on such screens show a marked tendency to twist or bend, which may be attributed to the fact that the drying process is not absolutely regular on the periphery of each individual product.

The present invention has for its object to avoid these disadvantages and to provide a method whereby paste products of the kind known as long goods may be directly dried in the form under which they are to be packaged and sold without requiring a subsequent sawing operation and without having to return any percentage of the dried products to the manufacturing process.

Another object of the present invention is to provide a drying method which will permit of drying such long goods under their final form without any risk of twisting or bending.

Still a further object of this invention is to provide such a drying method which may be carried into practice by means of a drying equipment of reduced overall dimensions.

In accordance with the present invention the products issuing from the extrusion machine and cut into straight pieces of equal length are pre-dried in the form of a substantially uniform layer of parallel components, without substantially disturbing the relative position of the components and the pre-dried and relatively hard products are thereafter submitted to a final drying operation while being rolled on each other, but while being substantially maintained parallel to each other.

The pre-drying operation may be effected on perforated surfaces, such as movable screens. It should be such that the pre-dried products be just sufficiently hard to retain their straight shape. This is practically obtained when their moisture content—which is at least approximately 30% at the outlet of the extruding machine—has been reduced to from 18 to 20%. The temperature of the drying air should be moderate and should preferably be between 55 and 65° C. This air should not be too dry in order to avoid an excessive superficial hardening of the products. A moisture content of about 75 to 80% in this air has proved satisfactory. The pre-drying operation is relatively rapid; it may take for instance about 1 to 1½ hours. It therefore only requires a drier of limited capacity. In other words the known disadvantages of driers operating wtih movable screen become of negligible importance. Furthermore during this pre-drying step the products remain quite straight, experience showing that the distortions which are observed when long goods are completely dried on perforated surfaces or screens in a single step, only occur lately in the process and in any case when the residual moisture content is well below 18%.

The final drying is conveniently carried into practice by means of elongated cylindrical cages which are rotated on themselves while being conveyed through an appropriate drier. The products longitudinally disposed within the cages are thus caused to roll on themselves like for instance cylindrical pencils in a cylindrical box rolling on a table. They are therefore uniformly exposed to the drying air, which eliminates any risk of distortion; they are besides hard enough to avoid becoming entangled with each other, as would be the case if the rotating cages were loaded with soft freshly extruded products which would behave like flexible strings. The air used in the final drying step is preferably at a lower temperature than for the pre-drying step, this temperature being conveniently between 50 and 55° C. with a moisture content of about 70%, i.e. somewhat less than in the pre-drying step. The final drying step should be carried on until the products are dried to the required extent for commercial purposes. This generally corresponds to a residual moisture content of about 12.5%.

For a better understanding of the present invention the annexed drawing shows a drying apparatus for the carying into practice of same.

In the drawing:

FIG. 7 illustrates the arrangement of the brush device adapted to discharge the pre-dried products from the pre-drying screens.

FIG. 9 shows the electric wiring diagram associated with the arrangement of FIGS. 7 and 8.

FIG. 10 is a perspective view of a rotating cage.

FIG. 11 illustrates the arrangement of the discharging mechanism provided at the outlet of the final drying chamber of the apparatus.

FIG. 12 diagrammatically shows the loading mechanism provided at the inlet of the final drying chamber.

Figure 1:
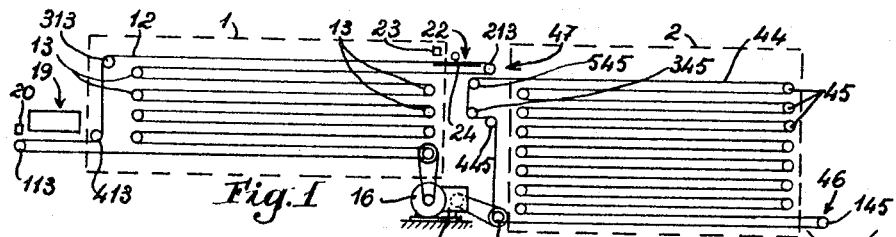
FIG. 1 is a quite diagrammatical side view of this apparatus.

Referring to FIG. 1 the apparatus illustrated comprises two chambers 1 and 2, each associated with separate means, not illustrated, whereby air may be circulated through each chamber at the proper temperature and with the proper moisture content. Chamber 1 forms the pre-drying chamber in which the products are pre-dried and hardened before passing through chamber 2 which forms the final drying chamber.

The products are supported within the pre-drying chamber 1 may pre-drying screens 3 (FIG. 2) each comprising a substantially rigid rectangular frame formed of two lateral longitudinal members 4 and of two end cross-members 5. Frame 4–5 supports a grid or netting 6 made of wire or of plastic material. The upper side of grid 6 is divided into a number of compartments, namely four in the illustrated embodiment, by a plurality of longitudinal partitions in the foms of bars 7 having their ends secured to cross-members 5. The width of the free space between two adjacent bars 7, is slightly greater than the length of the products to be treated. Frame 4–5 is supported by two pairs of rollers 8 and 9 rotatable on pins 10 which project laterally from the lateral longitudinal members 4, the rollers of each pair being substantially disposed along the same transverse axis. Each longitudinal member 4 further carries a transverse pin 11 which projects outwardly beyond rollers 8 and 9, these pins 11 being disposed on a common transverse axis which is slightly offset with respect to the transverse axis of symmetry of the screen, i.e. with respect to the center of gravity thereof.

Figure 6:
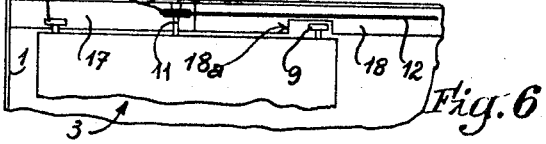
FIG. 6 is a horizontal section taken along line VI—VI (FIG. 3).

Pins 11 are secured to parallel endless chains 12 (FIGS. 1 and 3–6) carried and driven by toothed sprockets 13; as illustrated in FIG. 6 sprockets 13 may in turn be driven by sprockets 14 (FIG. 6) keyed on the shafts 15 on which sprockets 13 are mounted, the said shafts being passed through the lateral walls of chamber 1. Sprockets 14 are driven from a general motor 16 (FIG. 1) by suitable transmission means, not illustrated but forming no part of the present invention. Sprockets 13 are mounted within chamber 1 so as to determine for each chain 12 a zig-zag path formed of a superposition of horizontal runs alternately in one and the other direction, as clearly shown in FIG. 1. The screens 3 which follow chains 12 are guided horizontally by two series of superposed horizontal rails 17 and 18 (FIG. 3) on which their supporting rollers 8 and 9 roll alternately, rails 17 corresponding to the displacement from right to left in FIG. 3 and rails 18 corresponding to the displacement from left to right. The rails of each series start from one of the transverse walls of chamber 1 and terminate short of the other to leave the space required for mounting sprockets 13 and to permit passage of the screens 3 from one level to the next one, as this will be more fully explained hereinafter. At a small distance from the end of each rail which thus terminates short of the adjacent transverse wall the rail 17 or 18 is interrupted for a short distance, as indicated at 17a and 18a in FIGS. 3–5, this arrangement having for its purpose to permit passage of the rollers 8 or 9 which are at the rear of the successive screens 3 at the end of their stroke on the rails situated immediately below.

Figures 2, 4, 5:
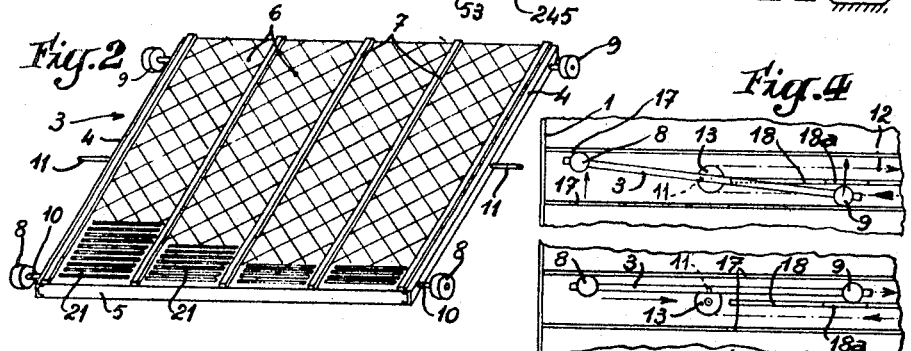
FIG. 2 is a perspective view of a pre-drying screen.
FIGS. 3 to 5 are fragmental side views of one of the inner walls of the pre-drying chamber illustrating the passage of a screen from one pair of rails to the next one within the said chamber.

I will be appreciated as beforesaid that screens 3 are unbalanced gravitationally about the transverse axis of pins 11 and that they tend to rock clockwise. Between two successive sprockets 13 of each lateral wall of chamber 1, each screen 3 follows a substantially horizontal path under the action of chains 12 which drive its lateral pins 11, and it is maintained at the horizontal position by its rollers 8 and 9 rolling on rails 17 during the travel of the screen towards the left and on rails 18 during its travel towards the right. When pins 11 reach sprockets 13, they follow the periphery thereof and they therefore rise. At the same time rollers 8 meet an interruption 17a in the corresponding rail 17 and they rise under the action of the unbalance of the screen (pins 11 being on the left of the center of gravity in FIGS. 3–5) which therefore rocks clockwise in FIG. 3 through a small angle, until rollers 8 engage the next rail 18. At the same time the rising of the hinge pins 11 which follow the periphery of the corresponding sprocket 13 (lower sprocket of the right-hand portion of FIG. 3) then causes the screen to progressively rotate counterclockwise about the axis of rollers 8 and to be returned to the horizontal position before its next stroke towards the left. At the end of the latter the same operation takes place: Rollers 9 meet an interruption 18a in rails 18 (FIG. 4) and the screen rocks clockwise under the action of gravity until rollers 8 engage the next rail 17, and it is progressively rotated counterclockwise about the axis of rollers 8 while pins 11 rise around sprockets 13. The screen is thus returned to the horizontal position for its next stroke towards the right (FIG. 5). The screen 3 is raised from a pair of rails 17 to a pair of rails 18 (or from a pair of rails 18 to a pair of rails 17) and it again moves horizontally within chamber 1, but in the reverse direction, as clearly indicated by the arrows.

It will be observed that at the right-hand end of rails 17, interruptions 17a permit passage of rollers 8 during the first or clockwise rocking step of the successive screens (see FIG. 3 on the right), while at the left-hand end of rails 18 interruptions 18a permit passage of rollers 9 during the second or counterclockwise rocking step of the screens (see FIG. 4).

As indicated in FIG. 1 the lowermost run of chains 12 (together with the corresponding rails 17, 18, not illustrated) begins at the outside of chamber 1, or in other words the first pair of chain-supporting sprockets, which has been referenced 113 in FIG. 1 and which may be termed inlet sprockets, is mounted outside of the said chamber, at a distance from the left transverse wall thereof in FIG. 1. In the same manner the last pair of chain-supporting sprockets, or outlet sprockets 213, is situated outside of chamber 1, at a distance from the left transverse wall thereof. From this last pair of sprockets 213 chains 10 are returned horizontally to the left through chamber 1, they pass on sprockets 313 and are directed downwardly towards lower sprockets 413 from which they reach horizontally the inlet sprockets 113.

The loading station device 19, which may be of any suitable construction, is disposed on the last horizontal run of chains 12, immediately before the inlet sprockets 113. When a predrying screen 3 reaches the loading station 19, it cooperates with a feeler switch 20 which stops motor 16 for a short time. During this period of standstill of chains 12, the screen 3 at the loading station receives a predetermined quantity of products to be dried, these products being arranged transversely with respect to the longitudinal compartments of the screen in the form of a substantially uniform layer 21 (these layers being only partly illustrated in FIG. 2).

Figure 3:
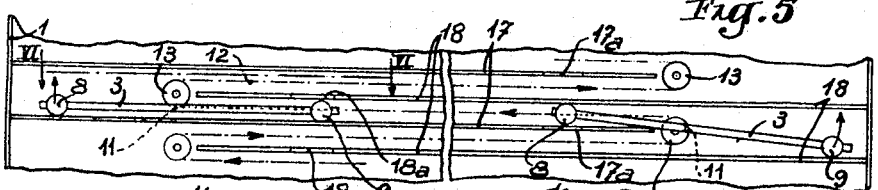

The chains 12 being re-started, the loaded screen 3 is re-introduced into chamber 1 wherein it follows an ascending zig-zag path in the above-explained manner. It is to be observed that owing to the length of the screens, their inclination during their rocking movement at the end of each stroke, as illustrated in FIGS. 3 to 5 is small enough to insure that the products will not roll downwardly on their perforated supporting surface 6, taking into account the fact that this surface may be as rough as may be suitable for this purpose. Owing to the passages of the successives screens 3 at the loading station 19 the movement of the chains, and therefore of the screens within chamber 1, is discontinuous or jerked, or in other words it comprises a succession of stops and starts.

Each screen finally reaches a discharging station 22 situated at the beginning of the last horizontal stroke, outside of chamber 1 and adjacent the outlet sprockets 213. The arrangement is such that this occurs when the endless chains 12 stops, i.e. just when another screen 3 reaches the loading station 19. A feeler switch 23 is momentarily actuated by the screen shortly before it stops at the discharging station 22, as for instance by one of the lateral pins 11 thereof, and this feeler switch causes operation of the brushing device illustrated in FIGS. 7 and 8.

This device comprises a brush 24 supported by a transverse bar 25 (FIG. 8) having its ends secured to blocks 26 slidably mounted in stationary U-shaped guiding rails 27. Rod 25 rigidly supports a collar 28 having an upwardly extending lug 29 the end of which is secured to a link of an endless chain 30 carried by two sprockets 31, one of which is driven by a motor 32. The circuit of motor 32 comprises (see FIG. 9) the normally open feeler switch 23 (actuated by the incoming screen), a normally closed switch contact 33 adapted to be actuated by brush 24 (or preferably by one of the blocks 26 which carry same, as indicated in FIG. 8), the said switch contact 33 being in parallel with feeler switch 23, and a reversing switch 34 actuated by a rod 35 having two stops or abutments 36 and 37 (FIG. 9) actuated by a block 26 respectively at one and the other end of the stroke of brush 24.

Figure 8:
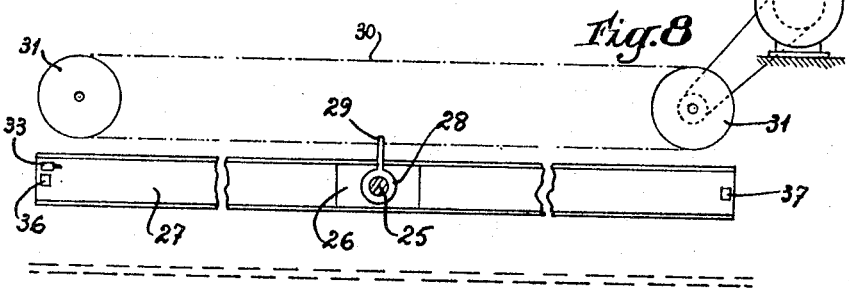
FIG. 8 is a section taken along line VIII—VIII of FIG. 7.

At the position of rest brush 24 is at its extreme left-hand position in FIGS. 7–9. Switch contact 33 is therefore open and reversing switch 34 is set for displacement of brush 24 towards the right. When a screen 3 reaches the discharging station 22 it momentarily closes feeler switch 23, thus starting motor 32. Brush 24 therefore begins moving towards the right, thus liberating switch contact 33 which closes before feeler switch 23 re-opens. Brush 24 therefore continues its stroke towards the right and at the end thereof it (or more exactly of one of its supporting blocks 26) actuates abutment 37 which reverses motor 32. Brush 24 therefore returns towards the right until it opens switch contact 33 which stops motor 32, since in the meanwhile feeler switch 23 has re-opened. It will be appreciated that during its stroke towards the right brush 24 sweeps the perforated surface 6 of the screen, thus causing the relatively hard pre-dried products to be discharged from the rear end of the screen.

The products thus discharged fall into a drying cage 38 which is at standstill at the proper position below the screen 3 under consideration with its cover fully open. Each cage 38 (FIG. 10) is formed of a perforated cylindrical wall having a length substantially equal to the width of the pre-drying screens 3, this wall having an opening which extends along the full length of the cage. This opening is normally closed by a hinged cover 39. Cover 39 is hinged to the perforated wall of the cage along a longitudinal edge of the opening thereof and it has an arcuate cross-section in such manner that at the closed position it completes the circular transverse contour of the cage. It is preferably itself perforated. Its free end has a longitudinal rod 40 having protruding ends 40a. It is urged towards its closed position by a torsional spring, not illustrated.

The inner space of each drying cage 38 is divided into a number of compartments equal to the number of compartments of the pre-drying screens 3 by circular inner partitions 41 and by two end walls 42. Each cage may thus receive in its compartments the pre-dried products from the respective compartments of each screen. Each end wall has an outwardly protruding axial pin 43 adapted to be rotatably carried by a lateral endless chain 44. Each chain 44 is supported by sprockets 45 so as to follow a descending zig-zag path within the final drying chamber 2. The last or outlet chain-supporting sprocket 145 is situated outside of chamber 2, on the right-hand side thereof in FIG. 1, so as to determine a discharging station 46 for cage 38. From these outlet sprockets 145 chains 44 return horizontally through chamber 2 and reach the returning sprockets 245 situated outside of chamber 2 on the left-hand side thereof in FIG. 1. From these returning sprockets 245 they are returned by intermediate sprockets 345 and 445 towards the inlet chain-supporting sprockets 545 which are situated below the discharging station 22 to determine the loading station 47 of the cages. Of course chains 44 may be supported within chamber 2 by appropriate rails (not illustrated) in order to be maintained at the horizontal position. To one of the end walls 42 of each cage 38 is fixed a toothed gear 48 (FIG. 10) adapted to cooperate with lateral racks 49 (FIG. 11) secured against the inner walls of chamber 2. It will easily be understood that the linear movement of cages 38 under the action of chains 44 thus causes rotation of the latter about their own axes. The other end of each cage 38 has a T-shaped outer rib comprising a diametral portion 50 (FIG. 10) corresponding to the bar of the T and a radial portion 51 perpendicular to portion 50 to form the limb thereof. The three ends of this T-shaped rib 50–51 are in the form of gear teeth to cooperate with stationary abutments 52 (FIG. 11) or 152 (FIG. 12) respectively provided at the discharging and at the loading station.

Chains 44 are driven by the general motor 16 which drives the chains 12 of the pre-drying chamber 1, but at a much lower speed, this being obtained by a speed-reducing gearing 53 (FIG. 1) interposed between motor 16 and the sprockets 245 of chains 44. As in the case of the pre-drying chamber, sprockets 45 may be mounted of shafts protruding through the lateral walls of the chamber and connected with each other by any appropriate means. In any case the arrangement is such that each time a pre-drying screen 3 stops at the discharging station 22, as above explained, a cage 38 stops under the latter to receive the pre-dried products which fall therefrom under the action of brush 24. At the same time another cage 38 stops at the discharging station 46. Of course the cage 38 which receives the pre-dried products should stand with its cover 39 in the open position and with its opening facing upwardly, while at the discharging station the cage should also have its cover open, but with its opening facing downwardly.

The mechanism which insures the unloading of the successive cages 38 at the discharging station 46 will first be described with reference to FIG. 11. As illustrated the last rack 49 terminates at a distance from the three stationary abutments 52. Considering a given cage, when its toothed gear 48 disengaged from rack 49, its T-shaped rib 50–51 may be at any position about the longitudinal axis of the cage. It may occur that the limb of the T be exactly vertical and directed downwardly (which position may be termed "normal" position of the rib) and abutments 52 are so located that in such a case they merely slide on the upper side of the horizontal bar of the T without causing rotation of the cage. If such is not the case, abutments 52 will act on one at least of the three branches of the rib and it is easily ascertained that whatever may be the initial position of the said rib, same will be positively brought to the above-mentioned "normal" position for which the limb of the T is vertical and pointing downwardly. In other words abutments 52 form a pegged rack while rib 50–51 may be considered as a four-toothed pegged wheel in which one tooth would have been suppressed. The arrangement of cages 38 is such that when the T-shaped rib 50–51 is at this "normal" position, the opening of the cage is facing upwardly.

The upper side of the T-shaped rib of the cage which has passed in front of abutments 52 engages a cam surface 54a formed by the inner side of a member 54 which surrounds the outlet sprockets 145, while the protruding ends 40a of the rod 40 secured to the free edge of the cover 39 of the cage engage the outer side or cam surface 54b of member 54. The inner cam surface 54a maintains the limb 51 of the T-shaped rib 50–51 perpendicular to the chains 44, i.e. directed towards the axis of sprockets 145, while the outer cam surface 54b progressively opens cover 39 against its biasing or returning spring. It results therefrom that when the cage 38 has rotated through 180° around sprockets 145, its opening faces downwardly with its cover 39 fully open. The dried products therefore fall onto an appropriate receiving member 55 (FIG. 11) which may be in the form of a conveyor whereby they are led towards a packaging station.

The outer cam surface 54b thereafter permits cover 39 to close under the action of its biasing spring.

It may be of course of advantage to provide cam surfaces 54b on both sides of the drier in order to act on both ends of the rod 40 of successive cages 38.

The mechanism which acts on cages 38 at the inlet or loading station 47 of the final drying chamber 2, i.e. under the discharging station 22 of the pre-drying screens 3, is quite similar to that described with reference to FIG. 11. It has been very diagrammatically shown in FIG. 12. Three successive abutments 152 disposed along the upwardly directed incoming path of chains 44 bring the successive cages 38 to a position in which the limb 51 of their T-shaped rib 50–51 is pointing towards the right, the transverse branch thereof being of course vertical. The inner side of an appropriate member 154 forms a cam surface 154a to act on the transverse branch 50 of the T, as cam surface 54a in FIG. 11, while its outer side forms another cam surface 154b which, as cam surface 54b of FIG. 11, opens the cover 39 of the successive cages 38 in order that they may receive the pre-dried products brushed from the pre-drying screens 3. As above explained, the successive cages 38 stop just below the discharging end of the screen which stops at the same time at discharging station 22.

Summarizing the above description, the products are just pre-dried on screens 3 in the form of a uniform layer until they are hard enough to support the final drying treatment in the drying cages 38 without becoming distorted due to the rotation of the latter. The chains 12 and 44 to which the pre-drying screens 3 and the final drying chambers 38 are attached are positively driven by the same general motor 16, which makes it possible to positively provide that whenever an empty screen 3 actuates feeler switch 20 at loading station 19, this switch causes stoppage of the said screen at said loading station 19, also stoppage of a loaded screen at intermediate discharging station 22, also stoppage of an empty final drying cage 38 with its cover opened at intermediate loading station 47, and also stoppage of a loaded cage 38 with its cover opened at final discharging station 46. Furthermore, just before the loaded screen 3 stops at intermediate discharging station 22, it actuates starting contact 23 (FIG. 9) which causes operation of brush 24, the latter sweeping off the pre-dried products from the screen to cause same to fall into the empty final drying cage 38 which is now at standstill at intermediate loading station 47, while the dried products fall by gravity from the cage 38 at standstill at final discharging station 46. After a short time, motor 16 is re-started for a next operating cycle.

I claim:

1. A method for drying long paste products cut to a predetermined length which consists in pre-drying by air at a temperature of about 55 to 65° C. having a moisture content of about 75 to 80%, said products to be dried in the form of a substantially uniform layer of substantially straight individual parallel components of equal length and without substantially disturbing the relative position of said components until said products are hard enough to retain their shape, said products to be dried being pre-dried until their moisture content is reduced to 18 to 20%, and in finally drying the pre-dried and relatively hard products by air at a temperature of about 50 to 55° C. having a moisture content of about 70% while rolling same on each other in batches, but while substantially maintaining same parallel to each other, said pre-dried products being finally dried until their moisture content is reduced to about 12.5%.

2. In a method as claimed in claim 1, said products to be dried being pre-dried on air-permeable supporting surfaces.

3. In a method as claimed in claim 1, said pre-dried products being finally dried within rotating elongated cylindrical air-permeable surfaces.

References Cited

UNITED STATES PATENTS

| | | | |
|---|---|---|---|
| 1,976,280 | 10/1934 | Fisher | 99—85 |
| 2,466,130 | 5/1949 | Surico. | |
| 3,094,398 | 6/1963 | Samson | 34—212 |

A. LOUIS MONACELL, *Primary Examiner.*

RAYMOND N. JONES, *Examiner.*